(12) United States Patent
Katic et al.

(10) Patent No.: US 7,154,946 B1
(45) Date of Patent: Dec. 26, 2006

(54) EQUALIZER AND EQUALIZATION METHOD FOR RETURN-TO-ZERO SIGNALS

(75) Inventors: Ognjen Katic, Vancouver (CA); Claudio Gustavo Rey, Stittsville (CA)

(73) Assignee: PMC-Sierra, Inc., Santa Clara, CA (US)

( * ) Notice: Subject to any disclaimer, the term of this patent is extended or adjusted under 35 U.S.C. 154(b) by 751 days.

(21) Appl. No.: 10/618,017

(22) Filed: Jul. 14, 2003

(51) Int. Cl.
*H03H 7/30* (2006.01)
*H04L 7/02* (2006.01)

(52) U.S. Cl. ...................... 375/233; 375/359
(58) Field of Classification Search ............... 375/229, 375/230, 232, 233, 256, 350, 359, 360, 316, 375/355
See application file for complete search history.

(56) References Cited

U.S. PATENT DOCUMENTS 7,023,941 B1 *  4/2006  Rey et al. .................... 375/355

OTHER PUBLICATIONS

Proakis, J.G. *Digital Communications*, 3rd Edition, McGraw-Hill, 1995.
Xiong, F. *Digital Modulation Techniques*, Artech House, 2000.
ITU-T Recommendation G. 775—"General Aspects of Digital Transmission Systems: Loss of Signal (LOS) and Alarm Indication Signal (AIS) Defect Detection and Clearance Criteria", 1994.
ITU-T Recommendation G. 823—"The Control of Jitter and Wander Within Digital Networks Which Are Based on the 2048 kbit/s Hierarchy", Mar. 1993.
Telecordia (Bellcore) GR-499-CORE—"Transport Systems Generic Requirements (TSGR): Common Requirements", Dec. 1995.

* cited by examiner

*Primary Examiner*—Tesfaldet Bocure
(74) *Attorney, Agent, or Firm*—Oyen Wiggs Green & Mutala LLP

(57) ABSTRACT

An equalizer for return-to-zero (RZ) signals comprises: (a) an equalizer core for equalizing the received signal; (b) a decision corrector for detecting and correcting misplaced pulses and double pulses in the equalized signal using known characteristics and properties of the RZ signal itself; and (c) an error calculator that generates an error signal for updating tap values based on the initial outputs of the equalizer core and the corrected outputs of the decision corrector. The decision corrector comprises a zero assertion counter that generates a clock synchronized with the timing of the received signal, and corrects the equalized signal by forcing zeroes in those portions of the equalized signal that the synchronized clock indicates should be "RZ" zeroes (as opposed to "data" zeroes or "data" symbols "1" or "−1"). The decision corrector further comprises a misplaced pulse detector for detecting misplaced pulses and double pulses based on both the output of the zero assertion counter and coding in the RZ signal, and corrects the equalized signal by moving the misplaced pulse or doubled portion of the pulse forward or backward in time in accordance with the principles of the RZ coding scheme used. The equalizer can further comprise interpolators for generating a plurality of signals based on the equalized signal, to provide a greater diversity of information for the decision corrector.

38 Claims, 12 Drawing Sheets

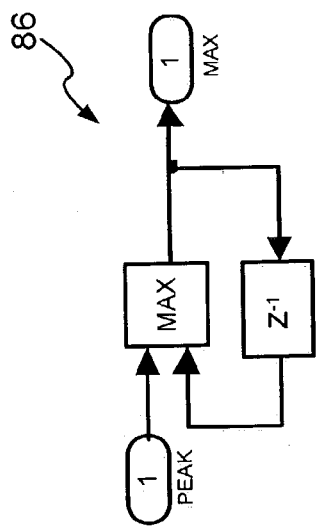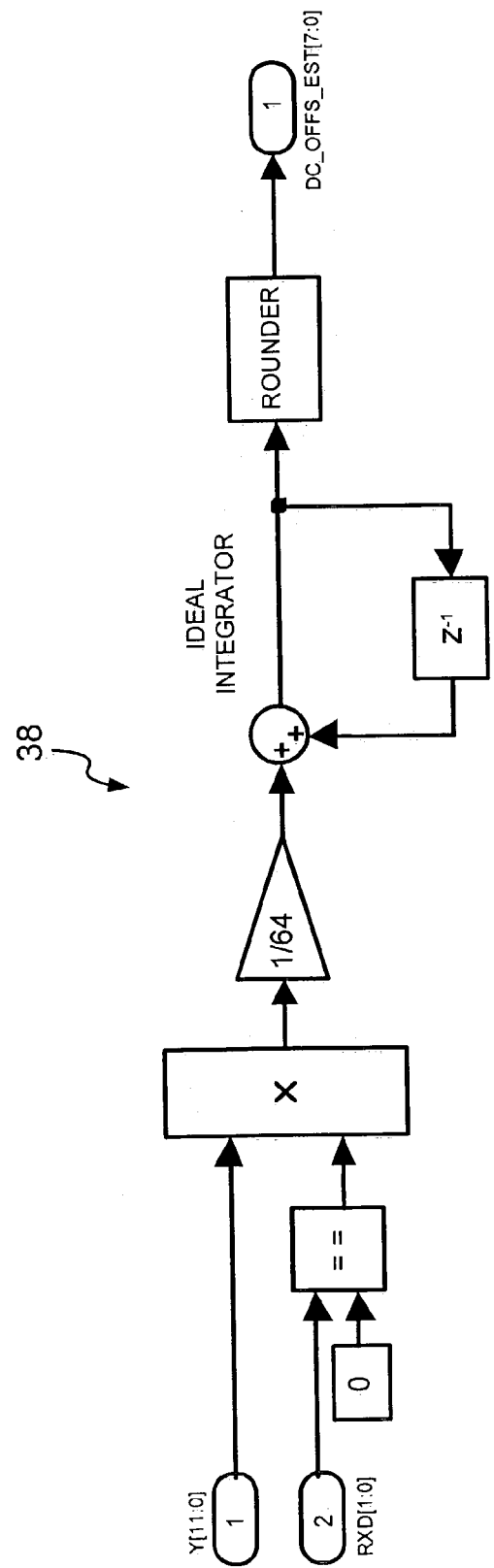

EQUALIZER AND EQUALIZATION METHOD FOR RETURN-TO-ZERO SIGNALS

TECHNICAL FIELD

This invention relates generally to data communications. More particularly, this invention relates to an equalizer and equalization method for return-to-zero (RZ) signals.

BACKGROUND

A variety of physical impairments limit the effective transmission of data signals over wireline and wireless channels, such as the frequency selective nature of the channels, which causes different frequency components of the input signal to be attenuated and phase-shifted differently. This causes the impulse response to span several symbol intervals, resulting in time-smearing and interference between successive transmitted input symbols, commonly known as intersymbol interference (ISI). The ISI resulting from the channel distortion, if left uncompensated, causes high error rates. The solution to the ISI problem is to design a receiver that employs a means for compensating or reducing the ISI in the received signal. The compensator for the ISI is called an equalizer.

There are two general classes of equalization techniques to mitigate ISI:

(a) Maximum likelihood sequence estimation (MLSE), where a dynamic programming algorithm is used to determine the most likely transmitted sequence, given observations of the received noisy and ISI-corrupted sequence and knowledge of the channel impulse response coefficients; and (b) Sub-optimal equalizer structures like a linear equalizer (LE), where one simple finite impulse response (FIR) filter is used to mitigate ISI, or a non-linear decision feedback equalizer (DFE) that in addition to the feedforward FIR filter, employs a feedback filter (FBF) on the previously detected symbols.

MLSE uses a sequence of received signal samples over successive symbol intervals to make decisions about the transmitted symbols, and is optimal from a bit error rate (BER) perspective. However, MLSE has a computation complexity that grow exponentially with the length of the channel time dispersion, and in most channels of practical interest, such a large computational complexity is prohibitively expensive to implement. In sub-optimal structures like LE and DFE, data detection is done on a symbol-by-symbol basis and hence is much simpler to implement than the optimal MLSE. Linear equalization uses a linear filter with adjustable coefficients. Decision feedback equalization exploits the use of previous detected symbols to suppress the ISI in the present symbol being detected.

In a typical baseband digital transmission over wireline, such as a DS3/E3/STS-1 line, the signal is distorted and attenuated due to the channel characteristics, cross talk, noise and timing jitter. Traditionally, an analog equalizer is used at the receiver to compensate for ISI due to the channel, and an analog timing recovery unit is used to acquire the optimal instant for sampling the received signal. Unfortunately, this technique has a slow convergence rate and will not yield as good a performance as that achieved by a straightforward linear symbol spaced equalizer (with ideal timing). Moreover, an analog equalizer circuit is usually power hungry when compared to a digital solution.

Analog equalization techniques also have a low jitter tolerance. Classic analog equalization techniques can barely meet the jitter tolerance of 0.3 $UI_{pp}$ required by the standards set out in ITU-T Recommendation G.823—"The Control of Jitter and Wander Within Digital Networks which are based on the 2048 kbit/s Hierarchy", March 1993; and Telecordia (Bellcore) GR-499-CORE—"Transport Systems Generic Requirements (TSGR): Common Requirements", December 1995.

Other typical techniques of mitigating ISI are digital and use a symbol or partial-spaced equalization. They may use a nonlinear "blind" timing algorithm that precedes the equalizer (non-decision-directed timing) or one that uses the decisions (decision-directed timing). Such techniques are described in Proakis, J. G., *Digital Communications,* 3rd Edition, McGraw-Hill, 1995, pp. 358–365. Methods that are based on the equalizer decision cannot handle input frequency offsets; as the equalizer tracks the frequency offset, the main tap slowly moves from one tap location to the next, eventually causing equalization failure. On the other hand, prior art techniques that use a blind, non-decision-based timing recovery are not very robust in the presence of high frequency input jitter.

What is needed is an equalizer with much improved robustness in the presence of input jitter. Ideally, the equalizer should achieve at least 0.5 $UI_{pp}$ jitter tolerance for frequency jitter in the range from 20 to 800 kHz.

SUMMARY OF INVENTION

An equalizer according to the invention for equalizing a return-to-zero (RZ) signal received from a communication channel comprises: (a) an equalizer core for equalizing the received signal and for updating tap values; (b) a decision corrector for detecting and correcting misplaced pulses and double pulses in the equalized signal using known characteristics and properties of the RZ signal itself; and (c) an error calculator that generates an error signal based on the "soft" outputs of the equalizer core and the "hard" decisions of the decision corrector, where the equalizer core then updates the tap values based on the error signal received from the error calculator. The decision corrector comprises a zero assertion counter that generates a clock synchronized with the timing of the received signal, and corrects the equalized signal by forcing zeroes in those portions of the equalized signal that the synchronized clock indicates should be "RZ" zeroes (as opposed to "data" zeroes or "data" symbols "1" or "−1"). In the preferred embodiment where the received signal is a coded RZ signal, the decision corrector preferably further comprises a misplaced pulse detector for detecting misplaced pulses and double pulses based on both the output of the zero assertion counter and the coding in the RZ signal, and corrects the equalized signal by moving the misplaced pulse or doubled portion of the pulse forward or backward in time by moving or zero asserting buffered samples of the equalized signal and outputting the results of the modified buffer. While the equalizer core is a linear equalizer in the preferred embodiment, it can just as easily be a decision feedback equalizer. The equalizer core can also use any adaptive algorithm, including the least-mean-square algorithm or the RLS algorithm for adapting tap values.

Preferably, the equalizer further comprises interpolators for generating a plurality of interpolated signals based on the equalized signal. This creates a diversity of information that mitigates the effect of input jitter. If so, then a corresponding plurality of slicers each compares an interpolated signal against a threshold value and outputs a signal having: (i) a "1" symbol for each portion of the interpolated signal that is positive and has an amplitude exceeding the threshold value; (ii) a "−1" symbol for each portion of the interpolated signal that is negative and has an amplitude exceeding the threshold value; and (iii) a "0" symbol otherwise. Then a decision combiner combines the output signals of the slicers into a single signal to the decision corrector that includes all "1" or "−1" symbols output by any of the slicers. The interpolators can be simple polyphase filter banks. In a less preferred embodiment, the interpolators, the decision combiner, and all but one slicer are omitted; although this allows for greater implementation simplicity, the diversity of information is lost.

The equalizer should further comprise a controller having a peak detector connected to the output of the interpolators (or equalizer core in less preferred embodiments where interpolators are not used), for analyzing the equalized signal, and determining from that analysis the threshold value to be used by each slicer. During periods when the peak detector determines the equalized signal from the equalizer core to be stable, the equalizer operates under a "constant mode" where the threshold value is set to a constant value. During periods when the peak detector determines the equalized signal from the equalizer core to be unstable, the equalizer operates under a "tracking mode" where the threshold value is adjusted regularly to track the unstable signal. Switching between the constant mode and tracking mode is controlled by a hysteresis comparator within the controller, along with other components of the controller.

The equalizer preferably further includes a DC offset estimator for estimating a DC offset based on the outputs of the equalizer core and the decision corrector, and a DC offset remover for removing the estimated DC offset from the received signal prior to its input into the equalizer core.

The equalizer preferably further comprises an error limiter for saturating the error signal produced by the error calculator to a predetermined maximum value before the error signal is passed to the equalizer core.

A receiver for use in a signal communication system can comprise an equalizer according to the invention in combination with: (a) an analog-to-digital converter for digitizing the received signal prior to its input into the equalizer; (b) a timing error detector having an input connected to a plurality of taps of the equalizer for measuring group delay and using the measured group delay to determine a timing error; and (c) further adjustment circuitry connected between the output of the timing error detector and the analog-to-digital converter, where the adjustment circuitry adjusts the timing of the analog-to-digital converter based on the timing error output by the timing error detector. The receiver can further comprise a variable gain amplifier for amplifying the received signal prior to its digitization by the analog-to-digital converter. In such a case, another function of the controller is to send to the variable gain amplifier a control word calculated to ensure that the quantization bit resolution for the analog-to-digital converter is maximized and to maintain the output of the analog-to-digital converter in an optimal range. The receiver should further include a signal detector for monitoring signals from the analog-to-digital converter, and for enabling the equalizer on the first incoming "1" or "−1" symbol after the signal detector detects a signal from the analog-to-digital converter.

An equalizer according to the invention tracks timing information and passes that information to the timing loop of the receiver. The operation of the equalizer and the timing loop are harmonized so that they do not compete. In particular, the time constants of the equalizer and the timing loop are chosen so that they are significantly different. In other words, the equalizer adapts very quickly, while the timing loop adapts slowly.

An equalizer according to the invention is very robust and easily satisfies the jitter tolerance requirement of 0.3 $UI_{pp}$ specified by the standards. In fact, the invention achieves far superior performance of at least 0.5 $UI_{pp}$ in the range from 20 to 800 kHz. Although even a basic equalizer according to the invention is itself quite robust and a significant improvement over analog and digital equalizers of the prior art, the further use of interpolators and/or further taking advantage of the coding within the RZ signal itself each improves the robustness of the invention. The best performance is achieved by an equalizer according to the invention having both interpolators and a decision corrector with a misplaced pulse detector that uses coded information within the RZ signal to correct misplaced pulses and double pulses.

BRIEF DESCRIPTION OF DRAWINGS

FIG. 14 is a schematic block diagram of the running maximum block of the controller core of FIG. 11.

FIG. 15 is a schematic block diagram of the DC offset estimator component of the equalizer of FIG. 2.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Receiver

Figure 1:
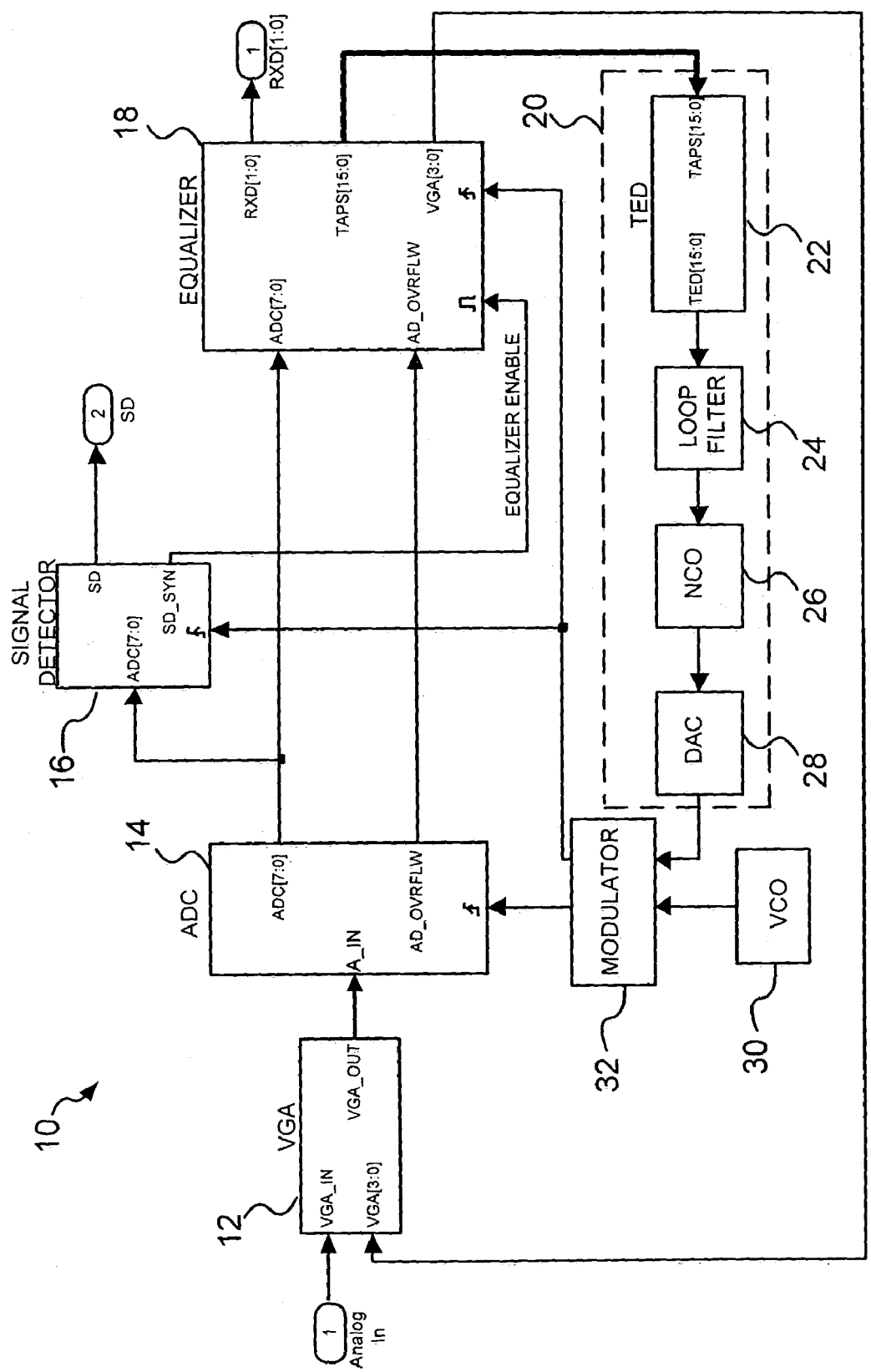
FIG. 1 is a schematic block diagram of a receiver including an equalizer according to a preferred embodiment of the invention.

FIG. 1 depicts a receiver 10 according to a preferred embodiment of the invention. Receiver 10 includes an equalizer 18 and a robust timing loop 20 such as the one disclosed in co-pending U.S. patent application Ser. No. 10/384,585 filed 11 Mar. 2003 which has been assigned to the assignee of this application, and the disclosure of which is hereby incorporated by reference. Equalizer 18 equalizes any type of return to zero (RZ) signal. Much of the following detailed description of the invention relates specifically to AMI-RZ type of signals that employ B3ZS or HDB3 coding schemes, such as those disclosed in Xiong, F., *Digital Modulation Techniques*, Artech House, 2000; however, as will be apparent to a person skilled in the art, and as further explained below, equalizer 18 may in fact be easily generalized to any type of RZ signal, even uncoded ones. RZ signals have two symbols per bit interval, the second symbol being a "0". According to the invention, information contained in the "0" symbol of every bit interval is used to properly train equalizer 18 so that it remains stable even during high frequency jitter conditions. This invention presumes a good communication channel with a high signal-to-noise ratio (SNR).

Referring to FIG. 1, receiver 10 comprises a variable gain amplifier (VGA) 12, an analog-to-digital converter (ADC) 14, a signal detector 16, equalizer 18, and timing loop 20. Timing loop 20 comprises a timing error detector (TED) 22, a loop filter 24, a numerically-controlled oscillator (NCO) 26, and a digital-to-analog converter (DAC) 28. A voltage controlled oscillator (VCO) 30 provides a reference clock frequency for ADC 14, which reference frequency is modulated with the output of timing loop 20 in order to fine-tune the clock frequency so as to offset the timing error detected by TED 22.

In use, an input analog signal is passed through VGA 12, and then converted by ADC 14 into a digital signal ADC[7:0] that is input into equalizer 18. Equalizer 18 is enabled by signal detector 16 on the first incoming symbol "1" or "−1" after signal detector 16 sets a signal detect signal SD to "high". Equalizer 18 also drives timing loop 20 by passing information about its tap values TAPS[15:0] to TED 22. Since equalizer 18 is a source for timing error detection, it works in harmony with timing loop 20. For this reason, the reference tap of equalizer 18 is always fixed, so it cannot move in extremely low jitter conditions. TED 22 produces a measure of group delay based on the tap values TAPS[15:0] of equalizer 18. The output of TED 22 is filtered through optional filter 24 and then processed by NCO 26. NCO 26 comprises a phase accumulator for converting a frequency input into a phase at the output, and that phase output is used as a pointer into a lookup table to generate an in-phase output and a quadrature output that are then passed through DAC 28 to a modulator 32 which modulates the clock frequency provided by VCO 30 with the output of DAC 28 in order to fine-tune the timing of ADC 14. Modulator 32 is preferably a single side band modulator, although any phase mixer or phase picker may be used instead, including a multiphase voltage controlled oscillator.

Other configurations for timing loop 20 will work as well, including those other configurations set out in the above-mentioned co-pending U.S. patent application Ser. No. 10/384,585. It is important, however, that the operation of equalizer 18 and timing loop 20 be harmonized so that they do not compete. In particular, the time constants of equalizer 18 and timing loop 20 should be chosen so that they are significantly different. Equalizer 18 should adapt very quickly, while timing loop 20 adapts slowly.

Equalizer

An equalizer 18 according to the invention carries out the following tasks:
removes ISI from the received signal;
passes the tap values TAPS[15:0] to timing loop 20;
removes any DC offset present on the incoming signal;
estimates the control word VGA[3:0] for VGA 12; and
corrects data in the presence of high frequency jitter.

Each of these functions will be described in detail below.

Figure 2:
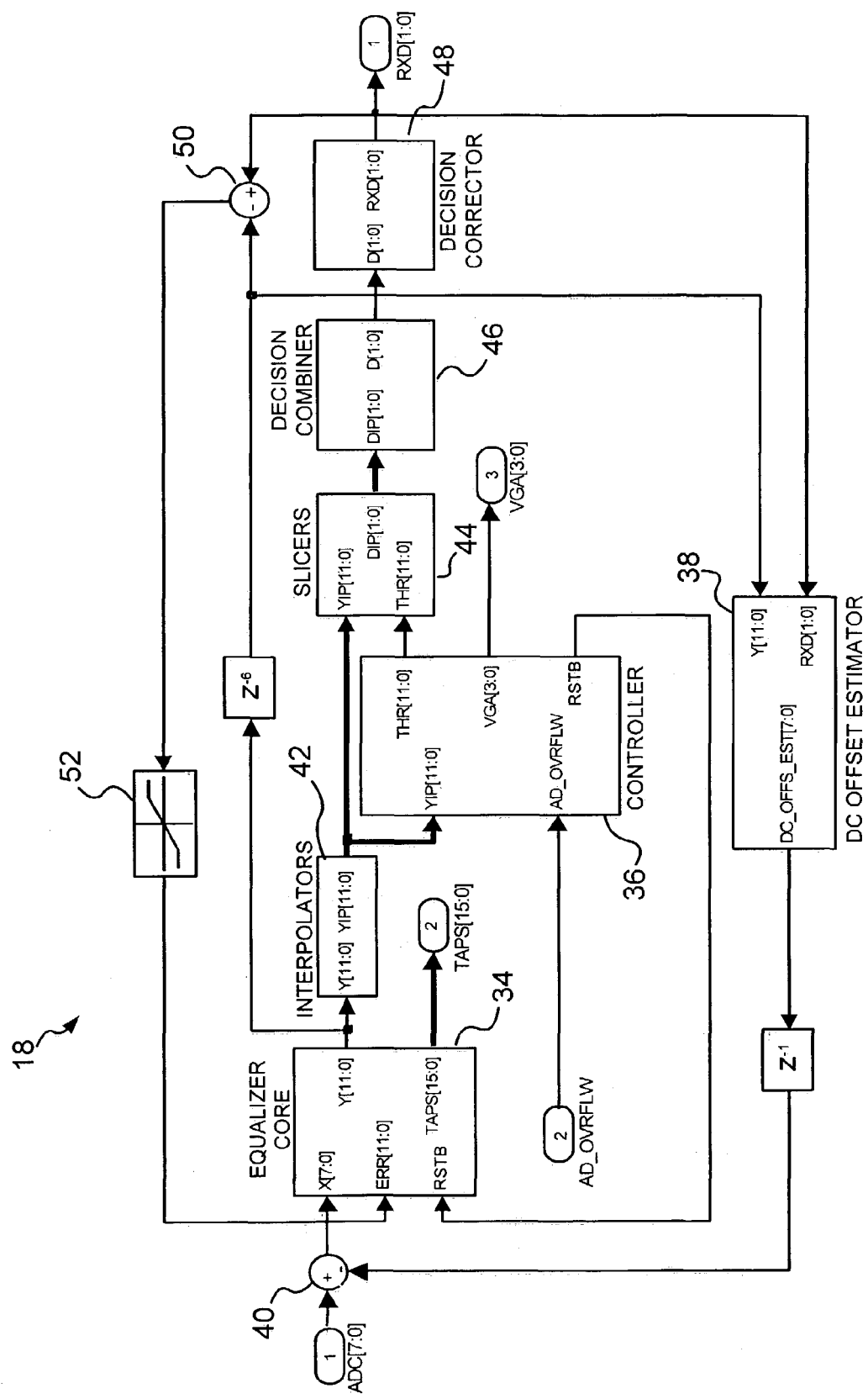
FIG. 2 is a schematic block diagram of an equalizer according to a preferred embodiment of the invention.

FIG. 2 is a schematic block diagram of equalizer 18 according to a preferred embodiment of the invention. Equalizer 18 comprises an equalizer core 34 that passes tap values TAPS[15:0] to TED 22 and outputs an equalizer "soft" decision signal Y[11:0] for further processing by other components of equalizer 18 to ultimately produce "hard" decision signal RXD[1:0], "hard" decision in this sense being the quantized output of equalizer 18 representing one of three logical levels "+1", "−1", or "0", and "soft" decision being an intermediate output by equalizer core 34 representing the unquantized equalizer output signal that is further used to make the hard decision. Equalizer 18 includes a controller 36, which in turn includes a peak detector 84, as explained in further detail below. Among other functions, controller 36 is initially used to set the correct control word VGA[3:0] for VGA 12, so that the quantization bit resolution for ADC 14 is maximized and the digital input signal ADC[7:0] into equalizer 18 is always in the optimal range. In other words, one of the functions of controller 36 is to cause ADC 14 to perform analog to digital conversion using its maximum range without saturating during steady state operation.

Referring to FIG. 2, equalizer 18 preferably further includes a DC offset estimator 38, which performs a DC offset estimation based on the soft decision signal Y[11:0] and hard decision signal RXD[1:0] of equalizer 18 during "0" symbol reception. The estimated DC offset is fed back and subtracted from the input signal ADC[7:0] by a DC offset remover 40 to produce an offset input signal X[7:0] into equalizer core 34. This technique is important for proper operation of the convergence algorithm. It subsequently significantly improves system performance.

High-frequency input jitter tolerance is achieved by further enhancing equalizer 18 with simple interpolators 42, slicers 44, a decision combiner 46, a decision corrector 48, an error calculator 50, and an error limiter 52, all for processing the equalizer soft decision output from equalizer core 34. These additional blocks have low implementation complexity, while significantly improving system performance (bit-error-rate) during severe high-frequency jitter. Referring to FIG. 2, input signal ADC[7:0] from ADC 14 to equalizer 18 preferably first undergoes DC offset removal by DC offset remover 40, and resulting signal X[7:0] is then passed to equalizer core 34, which in turn produces equalizer soft decision signal Y[11:0] for further processing by other components of equalizer 18 and also produces tap values TAPS[15:0] for TED 22 for timing recovery within receiver 10. The soft equalizer decision signal Y[11:0] output by equalizer core 34 is preferably interpolated by interpolators 42 to produce N soft decision signals YIP[11:0], N being an integer wherein N≧1. Interpolators 42 pass these N soft decision signals YIP[11:0] to a corresponding N identical slicers 44 to produce hard decision signals DIP[1:0] containing N decision streams. In particular, each slicer 44 considers whether the amplitude of a signal YIP[11:0] exceeds a decision threshold THR[11:0], and then outputs a "+1" or "−1" symbol if it does, and outputs a "0" symbol otherwise, as explained in greater detail below. In this regard, interpolators 42 also pass soft decision signals YIP[11:0] to controller 36, which in turn calculates and outputs the determining decision threshold THR[11:0] to slicers 44. The N decision streams of output signals DIP[1:0] are then processed by decision combiner 46 and decision corrector 48 to produce a hard decision signal RXD[1:0], as explained in further detail below. In the embodiment illustrated in FIG. 2, N is chosen to be 3 for purposes of illustration.

Figure 7:
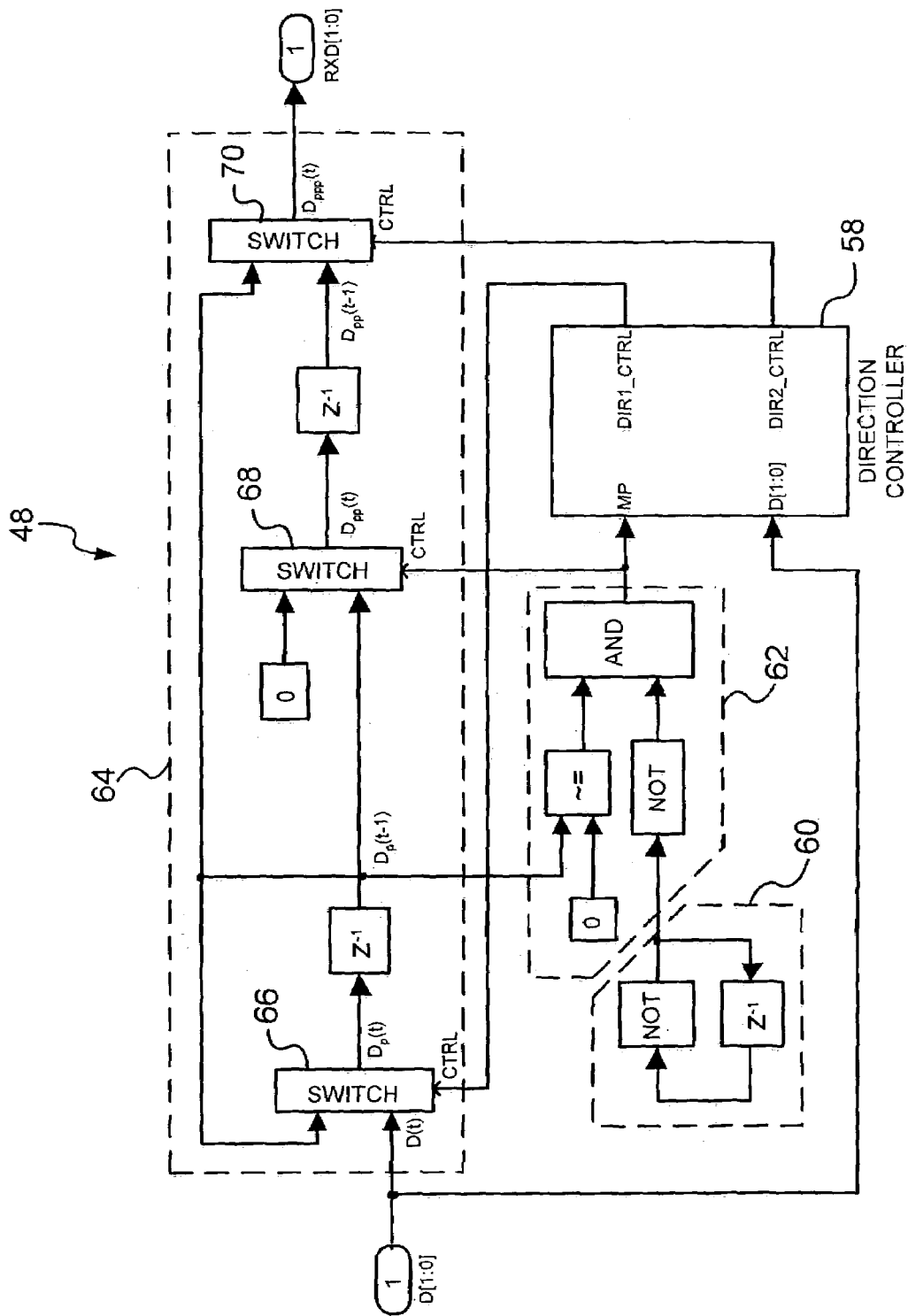
FIG. 7 is a schematic block diagram of the decision corrector component of the equalizer of FIG. 2.

The tap coefficients of equalizer 18 are adapted in accordance with an error signal ERR[11:0] computed by error calculator 50 from the hard decision signal RXD[1:0] and soft decision signal Y[11:0] of equalizer 18. Since there is a latency of K samples through interpolators 42 (K=4 in the embodiment illustrated in FIG. 2) and an additional latency of two samples through decision corrector 48 (as shown in FIG. 7 and as further explained below), error calculator 50 adjusts the soft decision signal Y[11:0] by a latency of K+2 to match the hard decision signal RXD[1:0] in order to compute the error signal ERR[11:0] accurately.

An error limiter 52 saturates the error signal ERR[11:0] computed by error calculator 50 to a maximum value of M (e.g. M=±0.15), which enables the adaptation of equalizer 18 to remain stable even when its soft decision signal Y[11:0] is not reliable. Error limiter 52 is important for achieving high-frequency jitter tolerance because it prevents an overly huge error signal ERR[11:0] from being passed back to equalizer core 34, and a corresponding huge wander of the taps of equalizer 18 around their optimal values when the system operates in high-frequency jitter environment.

Equalizer Core

Figure 3:
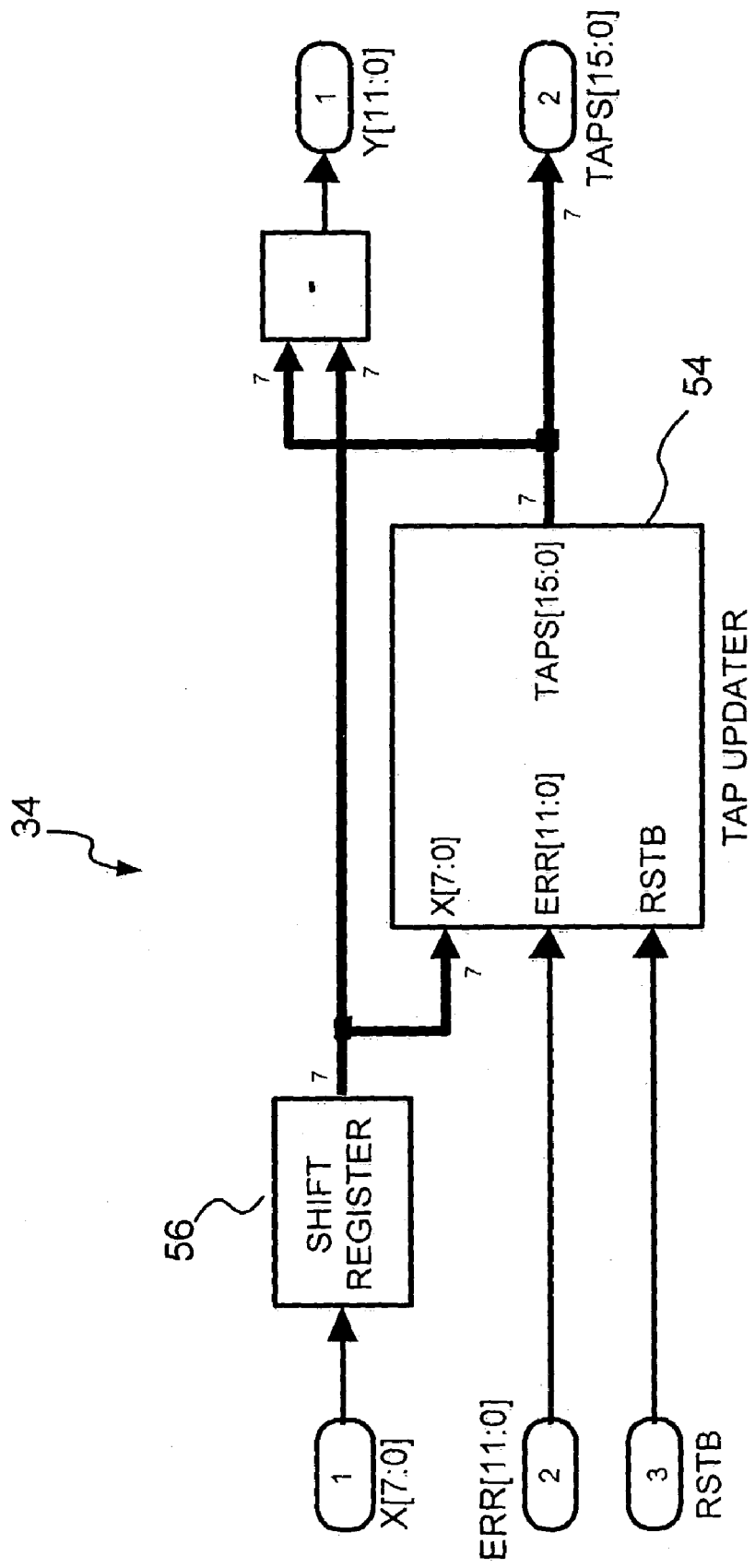
FIG. 3 is a schematic block diagram of the equalizer core of the equalizer of FIG. 2.

The primary task of equalizer 18 is to reduce ISI introduced by time-dispersive channel characteristics. For DS3/E3/STS-1 type channels, equalizer core 34 can comprise a simple linear equalizer (LE) that uses the least-mean-square (LMS) algorithm for adapting tap coefficients. The well-known LMS algorithm is explained in Proakis, J. G., *Digital Communications*, 3rd Edition, McGraw-Hill, 1995. In the embodiment illustrated in FIG. 3, equalizer core 34 is a transversal filter structure with adaptive LMS updating of tap coefficients, comprising a tap updater 54 and a shift register 56. Alternative adaptation algorithms may also be used without adversely affecting the operation of equalizer 18. For example, the RLS adaptive algorithm could be used. Also, equalizer core 34 could be a decision feedback equalizer (DFE) instead of a linear equalizer. Referring to FIG. 3, equalizer core 34 achieves the main task of equalizer 18 of cancelling the ISI introduced by channel characteristics. Furthermore, equalizer core 34 passes the equalizer tap values TAPS[15:0] to TED 22 to adjust timing. These tap values TAPS[15:0] contain timing information that is used for correction of the sample timing.

Figure 4:
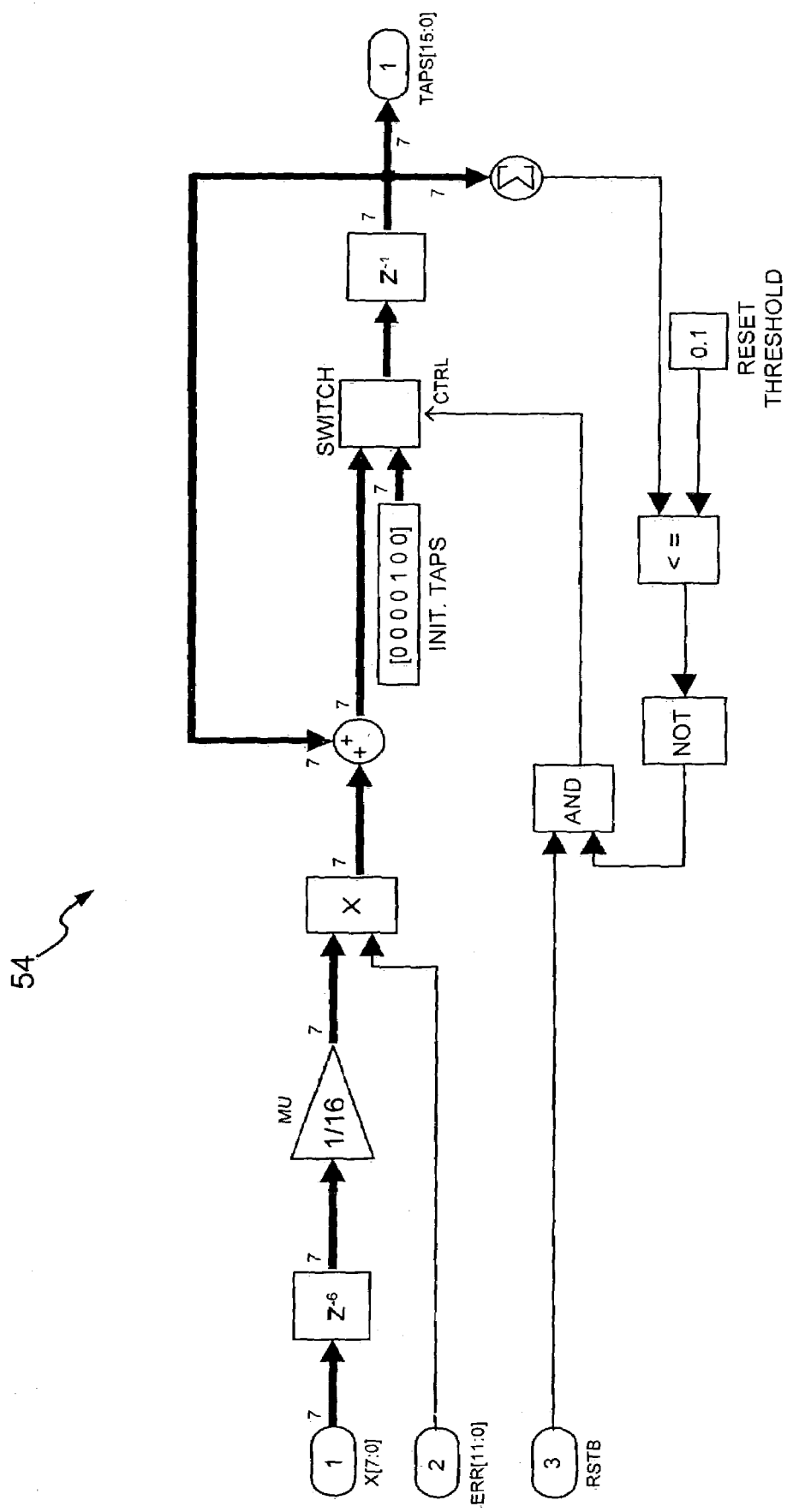
FIG. 4 is a schematic block diagram of the tap updater component of the equalizer core of FIG. 3.

FIG. 4 illustrates the LMS tap-update algorithm as implemented by tap updater 54. FIG. 4 illustrates an implementation of an LMS tap-weight adaptation algorithm similar to that explained in Proakis, J. G., *Digital Communications*, 3rd Edition, McGraw-Hill, 1995. However, in the tap updater 54 illustrated in FIG. 4, the algorithm has been modified to compensate for the latency introduced by interpolators 42 and decision corrector 48—in this case, a latency of 6 (being K+2, where K=4). Referring to FIG. 3 and FIG. 4, the input signal X[7:0] from DC offset remover 40 is passed from shift register 56 into tap updater 54, together with the error signal ERR[11:0] from error calculator 50, and tap updater 54 updates the tap coefficients accordingly. Also, input into tap updater 54 from controller 36 is a control reset strobe RSTB used to hold the taps of equalizer 18 at their initial values during adjustment of VGA 12. Tap updater 54 also re-initializes the tap coefficients of equalizer 18 when their sum falls below a pre-defined threshold, which in the example in FIG. 4 is set to 0.1. Such re-initialization is required if equalizer 18 is converging to an all zero solution.

Interpolators/Slicers/Decision Combiner

The soft output signal Y[11:0] of equalizer core 34 is then, as mentioned above, preferably processed by N interpolators 42. Interpolators 42 cover the span from $-T_s/3$ to $T_s/3$. Although it is possible to implement the invention without interpolators 42, the N interpolated equalizer soft decision output signals YIP[11:0] provide additional information about the original input signal, which is useful under high-frequency jitter conditions when the optimal sampling time can not be tracked by timing loop 20. Under these conditions when the optimal sampling point is very often shifted by a significant portion of the symbol interval, one of interpolators 42 may still provide a reliable detection of a "1" or "−1" data symbol. This is important, because a "0" data symbol is significantly less sensitive to errors because it is protected by two surrounding RZ guard intervals as illustrated in FIG. 5.

Figure 5:
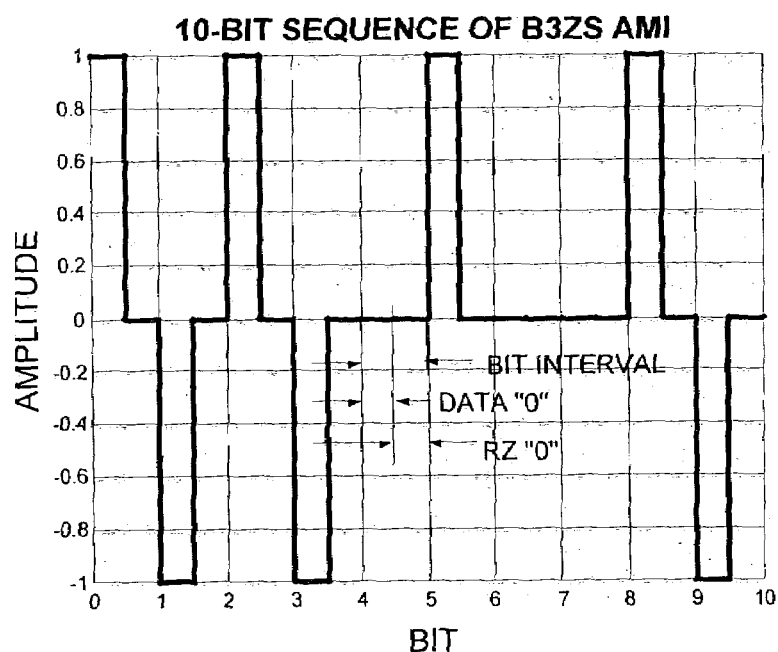
FIG. 5 graphically depicts a 10-bit random sequence of a B3ZS AMI-RZ line signal.

FIG. 5 illustrates a 10-bit random sequence of a B3ZS AMI-RZ line signal. As shown in FIG. 5, each bit of the sequence consists of the "data" and "RZ" portions of the bit-interval. The half-bit "data" interval represents one symbol. When high frequency jitter whose magnitudes are around 0.5 UI or more is imposed on the signal, data symbols are sampled during the "RZ" guard interval that is preceding or following the "data" symbol. Then, the error probability for "+1" or "−1" symbols is much higher than for the data "0" because the guard symbols are also zeroes. For this reason, it is desirable to favor a detection of "+1" or "−1", while the guard symbols may be reconstructed as described below. The result is that the interpolator-aided algorithm of this invention considerably reduces the bit error rate.

A simpler alternative embodiment of this invention forces a detection of "+1" or "−1" by simply reducing the level of decision threshold THR[11:0] closer to "0". In this alternative embodiment, interpolators 42 as well as decision combiner 46 and all but one slicer 44 may be omitted, leaving only a single slicer 44 to process the uninterpolated soft decision signal Y[11:0] directly from equalizer core 34. Lowering of decision threshold THR[11:0] will often produce double pulses and misplaced pulses in the output sequence. These pulses can be corrected by decision corrector 48 as described below. This alternate solution is very simple and it gives much better performance than classical analog equalizers. However, it will give lower performance than the interpolation-aided preferred embodiment in FIG. 2 because it does not use the diversity of information obtained from interpolators 42.

Interpolators 42 are implemented as simple polyphase filter banks. In the illustrated embodiment, the interpolator filter length is 8, while the cutoff frequency is 0.85 of the Nyquist rate (the Nyquist rate being equal to 1/UI). The N soft decision signals YIP[11:0] are passed from interpolators 42 to the corresponding N slicers 44 which make decisions about the incoming data based on decision threshold THR[11:0]. The pseudo-code of slicers 44 is as follows:

if (Y[11:0]>THR[11:0]),
  OUT[1:0]=1;
elseif (Y[11:0]<-THR[11:0]),
  OUT[1:0]=−1;

else,
    OUT[1:0]=0;
end;

Where N>1, the soft decision signals DIP[1:0] output by slicers 44 are input into decision combiner 46 to produce a combined decision signal D[1:0]. For an embodiment where N=3, the pseudo-code of decision combiner 46 is as follows:

if (DIP[1:0](1)=−1 or DIP[1:0](2)=−1 or DIP[1:0](3)=−1),
    D[1:0]=−1;
elseif (DIP[1:0](1)=1 or DIP[1:0](2)=1 or DIP[1:0](3)=1),
    D[1:0]=1;
else,
    D[1:0]=0;
end;

Decision combiner 46 takes the decision signals DIP[1:0] from each of slicers 44 and combines them in such a way that decision combiner 46 favors any "−1" and "1" symbols over "0". In other words, whenever a pulse is detected by any of slicers 44, decision combiner 46 outputs that pulse. In the embodiment with no interpolators and only one slicer 44, decision combiner 46 can be omitted.

Figure 6:
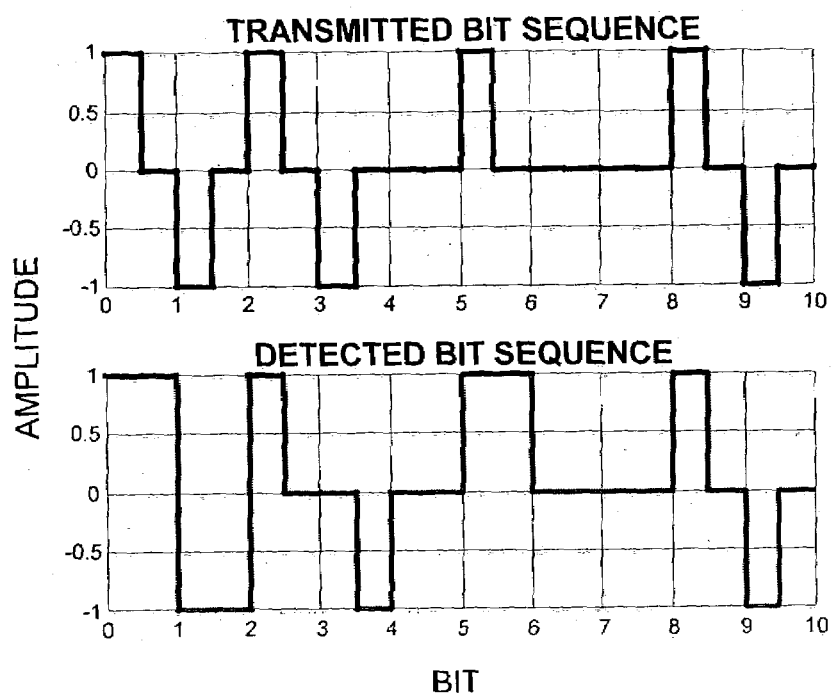
FIG. 6 graphically depicts the differences between the sequence of FIG. 5 as actually transmitted and as detected by a receiver.

In the interpolated-aided detection scheme, pulses may be erroneously doubled or misplaced in time since they are taken from the soft decision signals YIP[11:0] output by interpolators 42 that are nearly one sample apart. FIG. 6 illustrates one possible sequence of detected symbols that have double pulses as well as one misplaced pulse compared with the actually transmitted symbols. In the example in FIG. 6, doubling of the pulses happened on bits 1, 2 and 6, while the pulse at bit 4 was misplaced.

Decision Corrector

Decision corrector 48, illustrated in FIG. 7, corrects double pulse occurrences, misplaced pulses and other errors that occur on RZ intervals. Referring to FIG. 7, decision corrector 48 comprises a buffer 64, a zero assertion counter 60, a misplaced pulse detector 62, and a direction controller 58. Zero assertion counter 60 generates a clock that determines when a signal should be an RZ "0" and when it should contain data; using the clock, zero assertion counter 60 can be used to detect erroneous pulses in the RZ guard portion of the signal. To the extent that a pulse is detected in an RZ guard interval, that pulse can be zero asserted. Information from zero assertion counter 60 can also be used by misplaced pulse detector 62 and direction controller 58 to detect the nature of misplaced pulses and take corrective action accordingly. In particular, misplaced pulse detector 62 can output a control signal MP to direction controller 58 and to buffer 64 indicating whether or not a misplaced pulse or double pulse has been detected during an RZ guard interval, and whether or not direction controller 58 needs to take corrective action in respect of buffer 64 by moving the misplaced pulse forward or backward in time.

In operation of decision corrector 48, hard decision signal D[1:0] output by decision combiner 46 is passed into buffer 64 which, in FIG. 7, has a length of three; buffer 64 is represented by the outputs of switches 66, 68, 70. Each sample $D_p(t)$, $D_{pp}(t)$, $D_{ppp}(t)$ in buffer 64 can be modified. The time reference is set to the middle of buffer 64 after switch 68—i.e. to $D_{pp}(t)$. Table 1 below describes the operation of decision corrector 48:

TABLE 1

| Input | | | Output | | |
|---|---|---|---|---|---|
| MP | DIR1_ctrl | DIR2_ctrl | $D_p(t)$ | $D_{pp}(t)$ | $D_{ppp}(t)$ |
| 0 | 0 | 0 | D(t) | $D_p(t-1)$ | $D_{pp}(t-1)$ |
| 1 | 1 | 0 | $D_p(t-1)$ | 0 | $D_{pp}(t-1)$ |
| 1 | 0 | 1 | D(t) | 0 | $D_p(t-1)$ |

When misplaced pulse detector 62 detects a misplaced pulse at $D_p(t-1)$, which may be a single pulse or part of a double pulse, it outputs a control signal MP of "1" to switch 68 and to direction controller 58. In particular, when misplaced pulse detector 62 detects anything other than "0" during what zero assertion counter 60 indicates should be an RZ guard interval, the output of the AND gate of misplaced pulse detector 62, is set to "1", indicating the detection of a misplaced pulse and thereby setting control signal MP to "1". At switch 68, a control signal MP of "1" asserts the misplaced pulse to "0" at $D_{pp}(t)$ in the middle of buffer 64 to reflect the fact that $D_{pp}(t)$ should properly be "0" in the RZ guard interval. On the other hand, where misplaced pulse detector 62 detects no misplaced pulse during the RZ guard interval, it outputs a control signal MP of "0", and switch 68 therefore simply passes the correctly detected "0" of the RZ guard portion to the output of switch 68. Accordingly, regardless of whether control signal MP is "0" or "1", $D_{pp}(t)$ will be "0" during any RZ guard interval. Note that the control signal MP output by the AND gate of misplaced pulse detector 62 is always forced by zero assertion counter 60 to be "0" during the data portion of the signal, so that decision corrector 48 makes no modification to buffer 64 based on a detected data portion of the signal.

Rather than only zero asserting the portion of a pulse that is supposed to be an RZ guard interval and doing nothing else, misplaced pulse detector 62 together with direction controller 58 assess the nature of the error in the detected pulse, and direction controller 58 then corrects the error by moving the pulse forward or backward in time. The control signal MP that is passed to the direction controller 58 is used inside this block to produce the direction control signals DIR1_ctrl and DIR2_ctrl. If the direction control signal DIR1_ctrl is set to "1", the misplaced pulse $D_p(t-1)$ is passed to the output of switch 66, $D_p(t)$, thereby moving the pulse $D_p(t-1)$ forward in time. If the direction control signal DIR2_ctrl is set to "1", the misplaced pulse $D_p(t-1)$ is passed to the output of switch 70, $D_{ppp}(t)$, thereby moving the pulse $D_p(t-1)$ backward in time. Hence, the misplaced pulse $D_p(t-1)$ is cleared to "0" at the reference point $D_{pp}(t)$, but the information about the detected pulse is either passed forward or backward in time using the direction control signals DIR1_ctrl or DIR2_ctrl.

Control signals DIR1_ctrl and DIR2_ctrl output by direction controller 58 may not be "1" simultaneously. In the normal mode of operation of decision corrector 48, where no misplaced pulses are detected, both control signals DIR1_ctrl and DIR2_ctrl are "0". This will be further explained below with reference to FIG. 8. As shown in Table 1, when control signals DIR1_ctrl and DIR2_ctrl are both equal to "0", no modification occurs in buffer 64.

When control signal DIR1_ctrl is equal to "1" indicating a misplaced pulse should be moved forward in time, every incoming misplaced pulse is doubled after switch 66, and the first part of the doubled pulse is zero asserted at switch 68 using the misplaced pulse control signal MP, thereby correcting the double pulse. When control signal DIR2_ctrl is equal to "1", indicating a misplaced pulse should be moved backward in time, the misplaced pulse, which may be a single pulse or a second part of a double pulse, is passed to the output of switch 70. The misplaced pulse, which may be the second half of the double pulse, is zero asserted at switch 68 using the misplaced pulse control signal MP, thereby correcting the double pulse as required.

It is important to notice that a key block for the proper operation of the error correction is zero assertion counter 60. Zero assertion counter 60 generates a clock that determines when "0"s should be forced and when the data pulses X={−1, 0, 1} should be passed. For this reason, it is very important to start zero assertion counter 60 with the correct phase. This is achieved in cooperation with signal detector 16. If zero assertion counter 60 has not started properly, equalizer 18 can not converge to a non-trivial solution and it will be automatically reset. Then, equalizer 18 will again wait to be enabled by signal detector 16. Signal detector 16 may be implemented in accordance with the standard set out in ITU-T Recommendation G.775—"General Aspects of Digital Transmission Systems: Loss of Signal (LOS) and Alarm Indication Signal (AIS) Defect Detection and Clearance Criteria", 1994. In accordance with that standard, signal detector 16 sets detect signal SD to "high" after certain pre-specified number of symbol (half-bit) intervals. However, signal detect signal SD is not used for enabling equalizer 18, at least not directly. Rather, equalizer 18 is enabled on the first incoming symbol "1" or "−1" after signal detect signal SD is set "high". Then, zero assertion counter 60 is properly synchronized with the incoming data. Again, zero assertion counter 60 is useful in eliminating double pulses or misplaced pulses that may occur in the incoming data stream. These double pulses or misplaced pulses are the consequence of forced detection of "+1" and "−1" under high-frequency jitter conditions, when the timing is not accurate.

In the simplest form of error correction, it is possible to use only zero assertion counter 60 without misplaced pulse detector 62. However, the performance of decision corrector 48 would be reduced. Misplaced pulse detector 62 together with direction controller 58 make smart use of zero assertion counter 60. Rather than simply zero asserting the portion of a pulse that is supposed to be an RZ "0" without further analysis, misplaced pulse detector 62 and direction controller 58 assess whether or not the error is in the form of a double pulse or misplaced pulse and make a more accurate error correction by moving the pulse forward or backward in time. In other words, the error correction scheme of decision corrector 48 looks at the nature of the error in the detected pulse before clearing the detected pulse.

A single misplaced pulse is a consequence of extremely high-frequency jitter conditions and one does not want to lose information about the detected signals. This is justified by the previously introduced assumption that the data "0"s are very well protected from errors by the surrounding deterministic guard "0" symbols of the RZ signal as illustrated in FIG. 5. Furthermore, zero assertion counter 60 provides error-free transmission of the deterministic part of the RZ signal. Errors are most likely to happen during transmission of pulses "+1" or "−1". Therefore, if a single misplaced pulse is detected, it may be moved forward or backward in time according to the principles of whichever coding scheme is being used. The specific embodiment illustrated above uses B3ZS or HDB3 coding. However, the general method described above may be generalized to other similar return-to-zero coding techniques.

Figure 8:
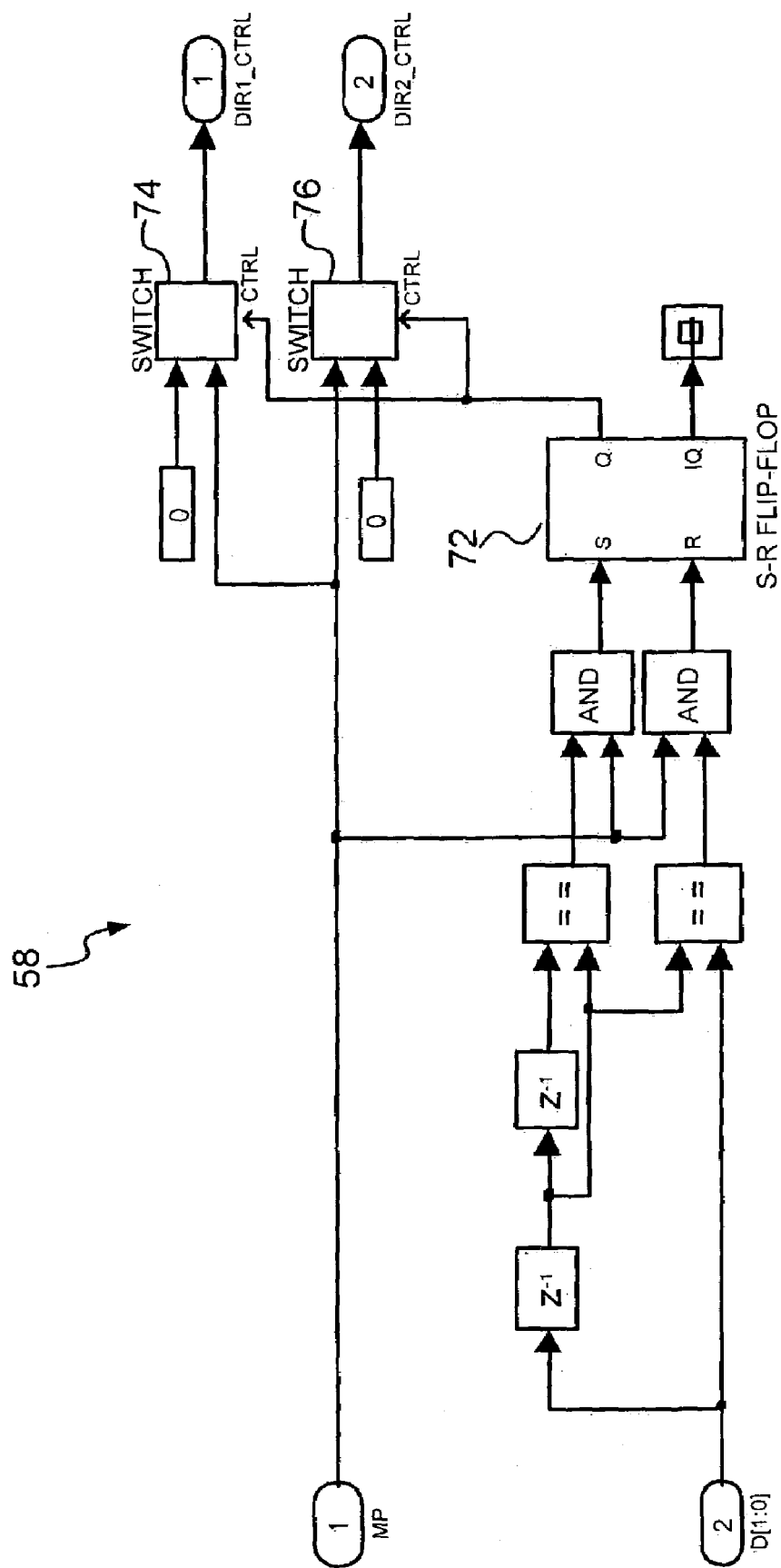
FIG. 8 is a schematic block diagram of the direction controller component of the decision corrector of FIG. 7.

The block diagram of direction controller 58, which generates control signals DIR1_ctrl and DIR2_ctrl, is shown in FIG. 8. Double pulses in the original stream of hard decision signal D[1:0] are used as a guide to determine the direction control signals DIR1_ctrl and DIR2_ctrl output by direction controller 58, as controlled by a control signal Q of flip-flop 72. Control signal Q is set or reset according to the position of the double pulse in time. If control signal Q is set to "1", the misplaced pulses should be moved backward in time by asserting a switch 76 to set control signal DIR2_ctrl to "1", assuming misplaced pulse control signal MP is also set to "1". This is equivalent to zero asserting the second half of the double pulse. If control signal Q is reset to "0", the misplaced pulses should be moved forward in time by asserting a switch 74 to set control signal DIR1_ctrl to "1", assuming misplaced pulse control signal MP is also set to "1". This is equivalent to zero asserting the first half of the double pulse.

Again, control signals DIR1_ctrl and DIR2_ctrl cannot be "1" at the same time, and when control signal MP is "0", both of control signals DIR1_ctrl and DIR2_ctrl must also be "0". Referring to FIG. 8, it can be seen that, when control signal MP is "0", all inputs into switches 74 and 76 are also "0", forcing switches 74 and 76 to output respective control signals DIR1_ctrl and DIR2_ctrl of "0" regardless of what the value of control signal Q may be at the time. However, when control signal MP is "1", it is passed to the first input of switch 76 or the second input of switch 74; since switches 74 and 76 are controlled by the same control signal Q, a control signal MP of "1" cannot be passed to the outputs of both switches 74 and 76 at the same time. Therefore, when control signal MP is "1" and control signal Q is "1", switch 74 outputs a control signal DIR1_ctrl of "0" and switch 76 outputs a control signal DIR2_ctrl of "1". However, when control signal MP is "1" and control signal Q is "0", switch 74 outputs a control signal DIR1_ctrl of "1" and switch 76 outputs a control signal DIR2_ctrl of "0".

Again, control signal Q is generated by a logic that keeps track of previous double pulses in the original stream of hard decision signal D[1:0]. Referring to FIG. 8, hard decision signal D[1:0] is passed through two delay elements and two comparators, from which double pulses can be detected. In deciding which part of the current double pulse should be zero asserted or in which direction a single misplaced pulse should be moved, the invention uses the knowledge from previously detected double pulses. Double pulses, like single misplaced pulses, set control signal MP to "1". However, when two consecutive pulses are "1", the output of one of the two AND gates in FIG. 8 will also be set to "1". Depending on which of the two AND gates is set to "1", it can be determined the direction in which jitter is affecting the detected signal. The outputs of the AND gates are used to set or reset flip-flop 72 and thus keeps track of the time references of the double pulses. If only control signal MP is "1", indicating a single misplaced pulse rather than a double pulse, the outputs of both AND gates are "0", in which case flip-flop 72 is unmodified and there is no change in the last direction setting. So, the invention uses uncorrected, detected hard decision signal D[1:0] to inspect double pulses and learn the effect of jitter on the signal. The invention then uses this information to determine the direction in which misplaced pulses should be moved.

Referring to FIG. 6, the second half of bit 4 is an example of a single misplaced pulse that should be moved backward in time—i.e., the pulse at time instant 3.5 should be moved to instant 3.0 to correct bit 4. Based on zero assertion counter 60, misplaced pulse detector 62 determines that the pulse at bit 4 is an erroneous pulse at what should be an RZ guard interval and misplaced pulse detector 62 outputs a control signal MP to switch 68 to force a "0" to restore the RZ guard interval. The same control signal MP is simultaneously sent to direction controller 58, but, in this case, the previous direction setting of direction controller 58 remains unchanged, since flip-flop 72 is affected only by double pulses and not single misplaced pulses. In the present example, the control signal DIR2_ctrl was previously set to "1" by the previous double pulses that occurred on bits 1 and 2 of FIG. 6. Those previous double pulses indicated that their second half was incorrect and should be zero asserted, which is equivalent to moving a single misplaced pulse backward in time. Hence, according to the operation of direction controller 58, previous double pulses in the bit stream are memorized to indicate the direction in which subsequent single misplaced pulses should be moved. In this case, control signal DIR2_ctrl was already set to "1" by the double pulses at bits 1 and 2, and remains at "1" when the misplaced pulse at bit 4 is detected, indicating that the misplaced pulse at bit 4 also needs to be moved backward in time. Accordingly, referring to FIG. 7 and Table 1, control signal DIR2_ctrl asserts switch 70 to pass the misplaced pulse $D_p(t-1)$ to the output at $D_{ppp}$ at the same time as control signal MP asserts switch 68 to force a "0" to restore the RZ guard interval. Notice that in the correction of single misplaced pulses, it is assumed that the direction determined by the previous double pulse is still valid. This assumption is reasonable in most practical cases.

Similarly, to move a misplaced pulse forward in time, control signal DIR1_ctrl asserts switch 66 to pass the misplaced pulse $D_p(t-1)$ to the output of switch 66 at the same time as control signal MP asserts switch 68 to force a "0" to restore the RZ guard interval. Note that, in this case, it does not matter if the data portion of the next symbol is correctly detected given that switch 66 passes to its output the misplaced pulse $D_p(t-1)$ rather than the next symbol in any event. If the misplaced pulse $D_p(t-1)$ was a single misplaced pulse, it has been zero asserted and moved forward in time correctly. If the misplaced pulse $D_p(t-1)$ was part of a double pulse, it was zero asserted and passed to the output of switch 66, but, at that moment, the next symbol (being part of a double pulse) would also have been equal to the misplaced pulse $D_p(t-1)$ in any event. Therefore, it does not matter whether the misplaced pulse $D_p(t-1)$ to be moved forward in time is a single misplaced pulse or a portion of a double pulse; the result is the same and it is correct.

Controller

As mentioned above, controller 36 is initially used to set the correct control word VGA[3:0] for VGA 12 so that the input signal ADC[7:0] from ADC 14 into equalizer 18 is maintained within the optimal range. The control word VGA[3:0], representing a gain setting, is selected so that the input signal ADC[7:0] is near maximum and is represented using the entire bit resolution of ADC 14 without saturating ADC 14. However, if saturation occurs, ADC 14 will provide an indication of saturation by sending signal AD_OVRFLW to controller 36, as shown in FIG. 1 and FIG. 2. In the preferred embodiment of this invention, controller 36 will increase the attenuation of the received signal in 1 dB steps during a predefined time window of 128 samples.

In the preferred embodiment of the invention, interpolators 42 and controller 36 together implement the function of controlling VGA 12. Interpolators 42 are important because initially the timing may be significantly sub-optimal. As a consequence, the input to ADC 14 is at a much lower amplitude than would occur at the optimal sampling points. The control word VGA[3:0] may be set incorrectly, which would produce saturation of ADC 14 after timing loop 20 converges. However, if the maximum sample amplitude is chosen between interpolator outputs that cover almost an entire symbol span, VGA 12 is deemed to be set to the correct value.

Figure 10:
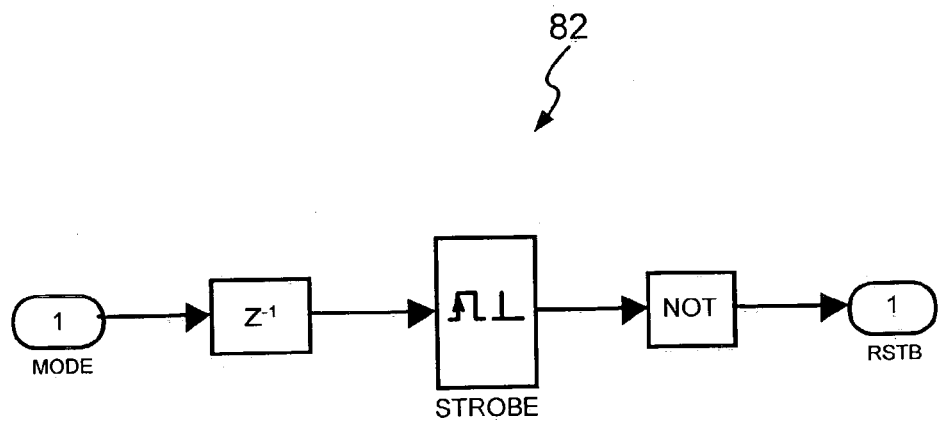
FIG. 10 is a schematic block diagram of the mode reset component of the controller of FIG. 9.
Figure 11:
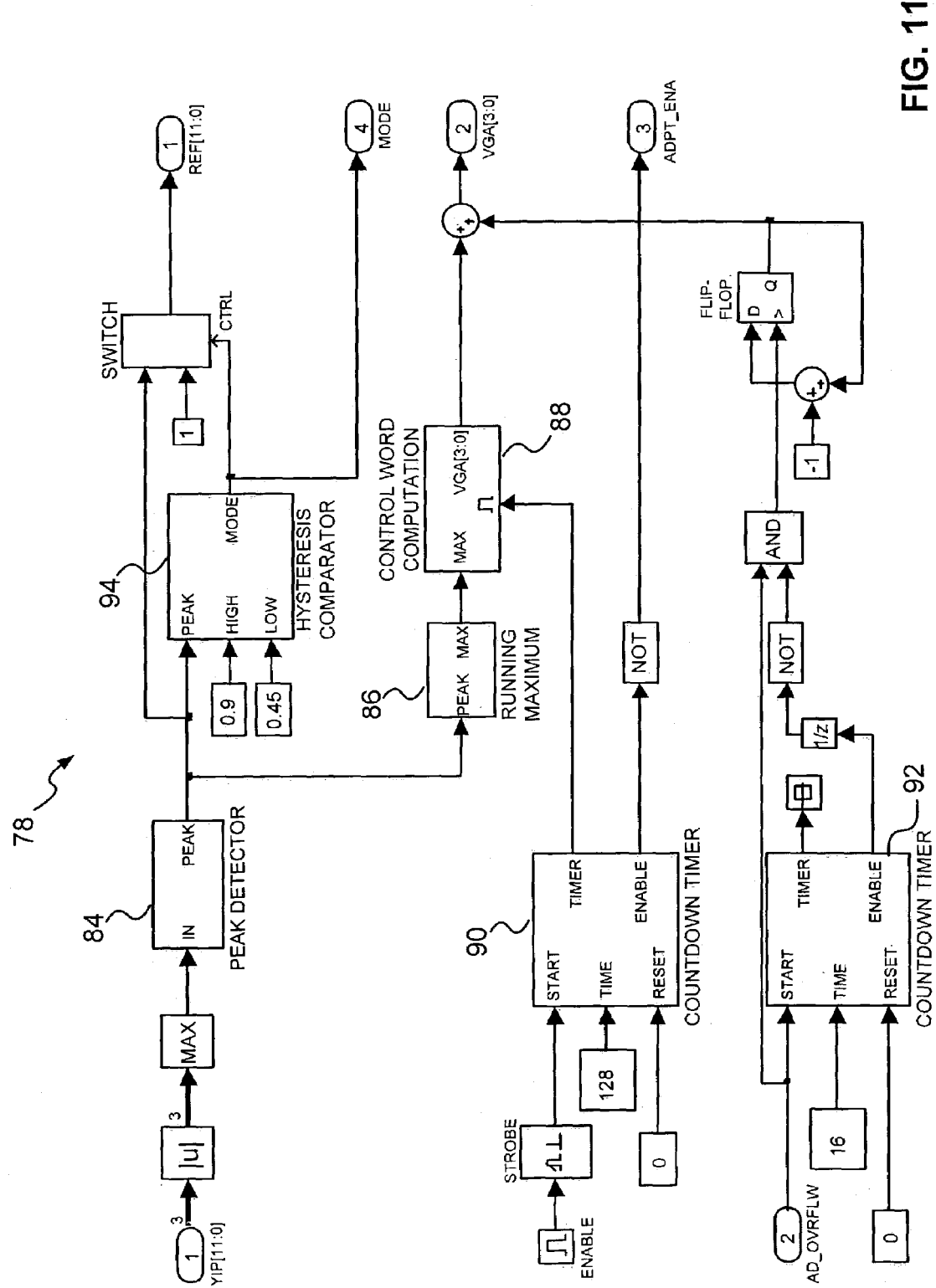
FIG. 11 is a schematic block diagram of the controller core component of the controller of FIG. 9.

Controller 36 is used with control circuitry to carry out two tasks: (1) control of VGA 12, and (2) control of the operational mode for decision threshold THR[11:0]. Referring to the block diagram of controller 36 in FIG. 9, controller 36 has three outputs: decision threshold THR[11:0] for slicers 44, control word VGA[3:0] for VGA 12, and equalizer control reset strobe RSTB for equalizer tap updater 54. Further referring to FIG. 9, controller 36 comprises a controller core 78, a threshold level control 80, and a mode reset 82. Mode reset 82 is illustrated in further detail in FIG. 10, and controller core 78 is illustrated in further detail in FIG. 11. Referring to FIG. 11, controller core 78 comprises a peak detector 84, a running maximum block 86, a control word computation block 88, two countdown timers 90, 92, and hysteresis comparator 94.

Figure 9:
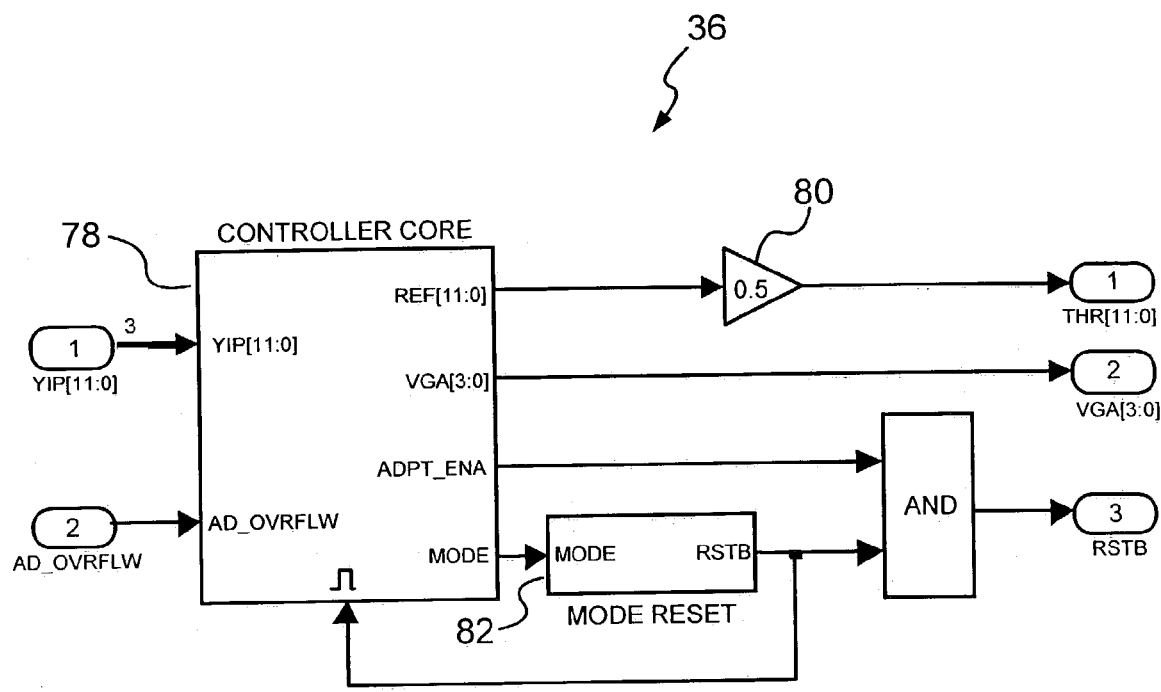
FIG. 9 is a schematic block diagram of the controller component of the equalizer of FIG. 2.

Referring to FIG. 9 and FIG. 11, countdown timer 90 holds equalizer core 34 in the reset mode while control word VGA[3:0] is being calculated by control word computation block 88. Furthermore, equalizer core 34 is reset by mode reset 82 whenever the operational mode for decision threshold THR[11:0] changes from a "constant mode" to a "tracking mode", as further explained below. When soft decision signal Y[11:0] output by equalizer core 34 has not stabilized about nominal levels, peak detector 84 is used to regularly adjust the decision threshold THR[11:0] to an appropriate level. This mode of operation is called tracking mode. After the transition period, the decision threshold THR[11:0] is set to a constant value, which is further used in the operation of equalizer 18. This is called the constant mode of operation. Constant mode of operation is preferred because it provides more immunity to the high frequency jitter. However, high-frequency jitter may introduce errors in the decoded bit sequence, which can cause equalizer 18 to converge to its trivial solution (all zero coefficients). Should the all-zero case occur, controller 36 returns the decision threshold THR[11:0] to the tracking mode of operation. Then, equalizer core 34 is able to recover its coefficients to a stable solution. Switching between the tracking and constant modes is controlled by mode reset 82 together with hysteresis comparator 94.

In use, referring to FIG. 11, soft decision outputs YIP[11:0] of interpolators 42 are rectified and then passed through peak detector 84. However, equalizer core 34 is not enabled for the first A samples defined by countdown timer 90 (A=128 in this embodiment). During this initial period, peak detector 84 outputs peaks through running maximum block 86 to control word computation block 88. Based on the running maximum value of such peaks, control word computation block 88 calculates the control word VGA[3:0] for VGA 12. Then countdown timer 90 causes a signal ADPT_ENA to be sent to enable equalizer core 34 to start the equalizer adaptation process.

Referring to FIG. 11, the second countdown timer 92 and its associated circuitry are used for increasing the attenuation when ADC 14 sends a signal AD_OVRFLOW to controller core 78 to indicate an overflow condition. The control word VGA[3:0] is then changed in 1-dB steps every B samples (B=16 in this embodiment).

Figure 12:
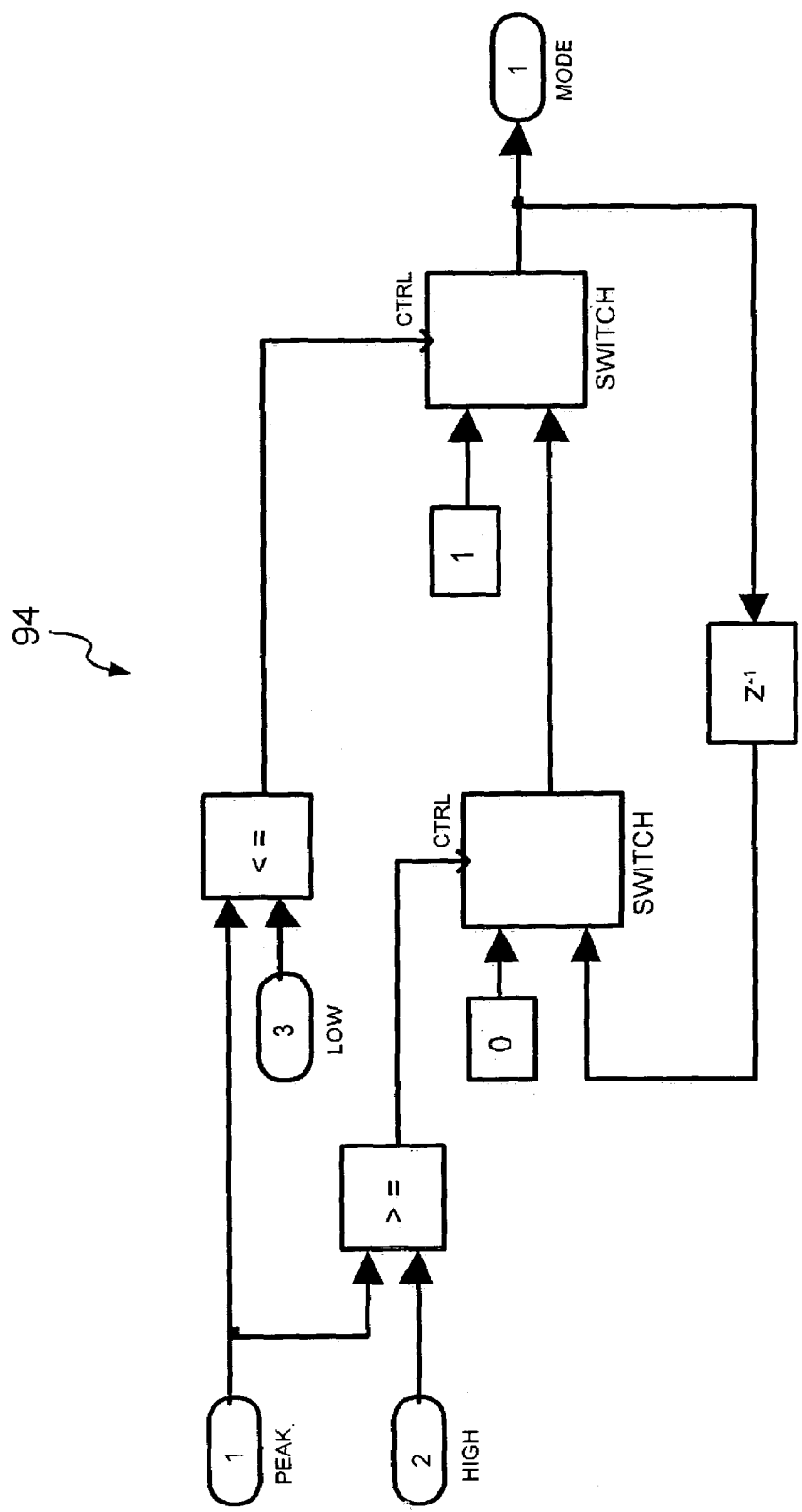
FIG. 12 is a schematic block diagram of the hysteresis comparator component of the controller core of FIG. 11.

The structure of hysteresis comparator 94 is illustrated in detail in the block diagram of FIG. 12. Referring to FIG. 11 and FIG. 12, hysteresis comparator 94 prevents oscillations that could happen if the mode switching of decision threshold THR[11:0] was done always at a single level. Through hysteresis comparator 94, the peak values output by peak detector 84 must increase above the specified "high" threshold level of hysteresis comparator 94 before controller 36 will change the operational mode of decision threshold THR[11:0] to the constant mode of operation. Similarly, the peaks output by peak detector 84 must stay below the "low" threshold level of hysteresis comparator 94 before controller 36 will change the operational mode back to the tracking mode. By using two distinct levels for effecting switches between modes, one avoids an undue degree of oscillations back and forth between tracking mode and constant mode that would occur if switches in either direction were instead based on a single level, especially if the peaks output by peak detector 84 hovered around that particular single level. In the embodiment illustrated in FIG. 11, the "high" and "low" levels were set to 0.9 and 0.45 respectively, but any other values between 0 and 1 could be used instead.

Figure 13:
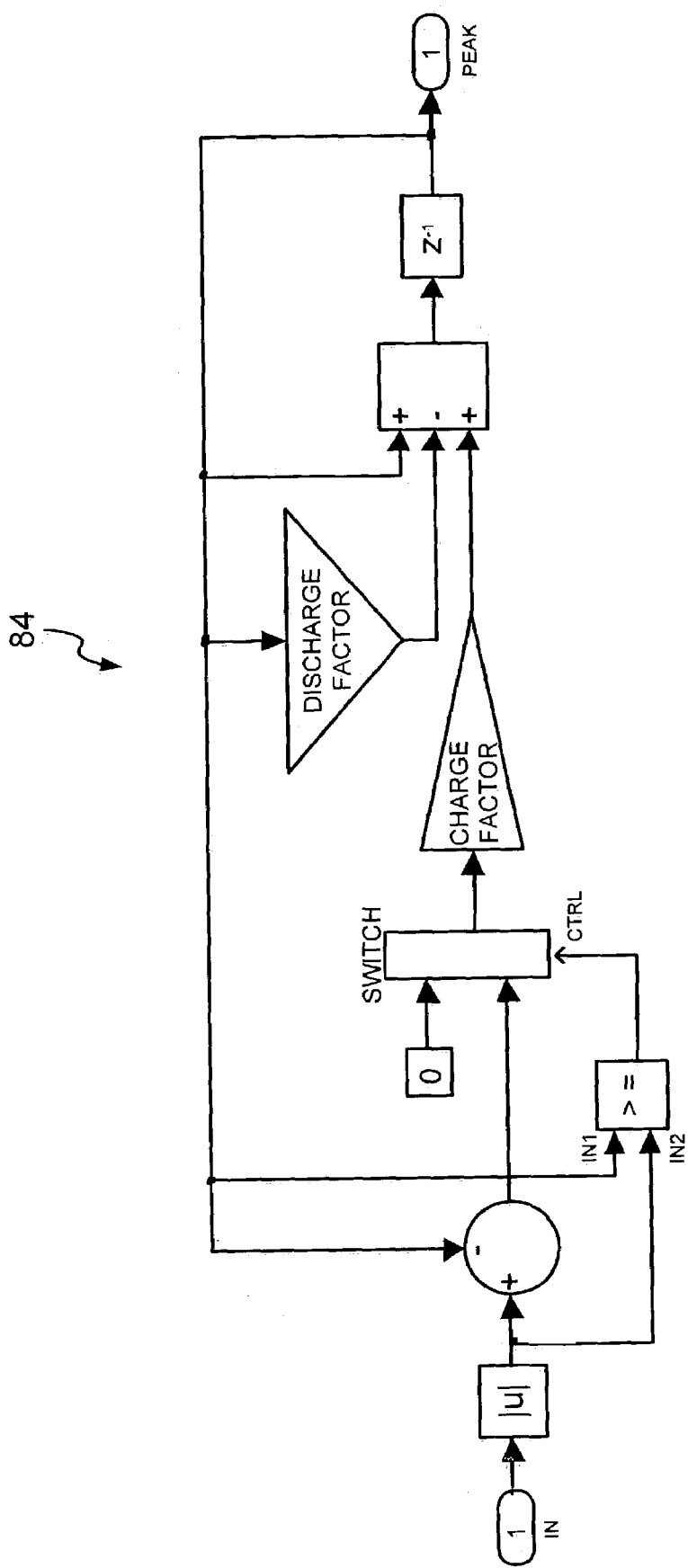
FIG. 13 is a schematic block diagram of the peak detector component of the controller core of FIG. 11.

The structure of peak detector 84 is illustrated in detail in the block diagram of FIG. 13. Peak detector 84 is implemented with digital components but simulates the behavior of an analog circuit.

The structure of running maximum block 86 is illustrated in the block diagram of FIG. 14.

The pseudo-code of control word computation block 88 is as follows:

```
if (MAX<=0.310),
    VGA[3:0]=2.85;
elseif (MAX<=0.350),
    VGA[3:0]=2.54;
elseif (MAX<=0.390),
    VGA[3:0]=2.26;
elseif (MAX<=0.440),
    VGA[3:0]=2.00;
elseif (MAX<=0.500),
    VGA[3:0]=1.78;
elseif (MAX<=0.560),
    VGA[3:0]=1.58;
elseif (MAX<=0.625),
    VGA[3:0]=1.40;
elseif (MAX<=0.700),
    VGA[3:0]=1.25;
elseif (MAX<=0.790),
    VGA[3:0]=1.12;
else,
    VGA[3:0]=1.00;
end;
```

DC Offset Estimator

The structure of DC offset estimator 38 is illustrated in detail in the block diagram of FIG. 15. As mentioned above in reference to FIG. 2, DC offset estimator 38 performs a DC offset estimation based on the soft decision signal Y[11:0] and hard decision signal RXD[1:0] of equalizer 18 during "0" symbol reception. In particular, referring to FIG. 15, DC offset estimator 38 integrates the soft decision signal Y[11:0] during "0" transmissions and determines a DC level that may be present in the signal Y[11:0]. Such a DC component could be introduced as a consequence of different effects caused by ADC 14, pulse shaper imbalances, and so on.

Improved Equalization

The invention advantageously uses the asymmetry in error probabilities to improve bit error rates in high jitter environments for the chosen line coding schemes. Equalizer 18 implements:

a zero tracking and assertion method for guided training of equalizer 18;

a method for relocating pulses misplaced by the timing jitter;

preferably, the use of interpolation to mitigate timing distortions of peaks;

preferably, the use of decision error saturation to stabilize equalizer 18 under extremely high frequency jitter; and preferably, the use of a constant mode and a tracking mode for the threshold level of slicers 44.

An equalizer 18 with a decision corrector 48 according to the invention employs very fast training and adaptation. Equalizer 18 according to the invention uses the known characteristics and property of the RZ data sequence to quickly and accurately track and correct errors and improve equalization. As mentioned above, error calculator 50 uses both the soft decision signal Y[11:0] from equalizer core 34 and the corrected hard decision signal RXD[1:0] output by decision corrector 48 to produce the error signal ERR[11:0] used by tap updater 54 to adjust the tap coefficients of equalizer 18. Equalizer 18 thereby produces fast and reliable tracking of timing information and thereby allows the tap values TAPS[15:0] to be effectively used in further timing recovery in a robust timing loop such as timing loop 20 of FIG. 1.

Equalizer 18 is very resistant to input timing jitter well beyond the accepted limit of about 0.3 UI. The use of decision corrector 48 within equalizer 18 improves the performance of equalizer 18, especially where decision corrector 48 uses not only a zero assertion counter 60 but also a misplaced pulse detector 62. Interpolators 42 further improve performance. Accordingly, the best performance is provided by an interpolator-aided equalizer 18 applied to coded RZ signals (like B3ZS/HDB3 or similar coded signals), with a misplaced pulse detector 62 that takes into account not only the properties and characteristics of RZ signals generally, but also the specific coding in the coded RZ signals for more accurate and reliable misplaced pulse correction. An interpolator-aided equalizer 18 using only a simple zero assertion counter 60 for decision correction according to the invention also achieves better performance than the classical solutions, but has lower performance than an interpolator-aided equalizer 18 with a more sophisticated misplaced pulse detector 62 because the zero assertion counter does not use the information coded into the signal; however, such an equalizer 18 can be used with any RZ signal, not just coded ones. A simple equalizer 18 without interpolators but with a sophisticated misplaced pulse detector 62 achieves similar performance to an equalizer 18 with interpolators 42 but having only a zero assertion counter 60; the main advantage of such an equalizer 18 is implementation simplicity while its drawback is that it may be used only on coded RZ signals.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An equalizer for equalizing a return-to-zero (RZ) signal received from a communication channel, comprising:

(a) an equalizer core for equalizing the received signal and for updating tap values;

(b) a decision corrector for detecting and correcting misplaced pulses and double pulses in the equalized signal, wherein the decision corrector:

(i) comprises a zero assertion counter that generates a clock synchronized with the timing of the received signal, and
(ii) corrects the equalized signal by forcing zeroes in those portions of the equalized signal that the synchronized clock indicates should be RZ zeroes; and
(c) an error calculator that generates an error signal based on the outputs of the equalizer core and the decision corrector, and passes that error signal to the equalizer core, and wherein the equalizer core updates the tap values based on the error signal received from the error calculator.

2. An equalizer as claimed in claim 1, further comprising:
(a) interpolators having inputs connected to the output of the equalizer core for generating a plurality of interpolated signals based on the equalized signal;
(b) a plurality of slicers, each having an input connected to the output of a corresponding interpolator, for comparing the interpolated signal against a threshold value and outputting a signal having:
    (i) a "1" symbol for each portion of the interpolated signal that is positive and has an amplitude exceeding the threshold value,
    (ii) a "−1" symbol for each portion of the interpolated signal that is negative and has an amplitude exceeding the threshold value, and
    (iii) a "0" symbol otherwise;
(c) a decision combiner having inputs connected to the outputs of the slicers and an output connected to the input of the decision corrector, for combining the output signals of the slicers into a single signal to the decision corrector that includes all "1" or "−1" symbols output by any of the slicers.

3. An equalizer as claimed in claim 2, wherein the interpolators are polyphase filter banks.

4. An equalizer as claimed in claim 1, further comprising a slicer having an input connected to the output of the equalizer core and an output connected to the input into the decision corrector, for comparing the equalized signal against a threshold value and outputting to the decision corrector a signal having:
(a) a "1" symbol for each portion of the equalized signal that is positive and has an amplitude exceeding the threshold value,
(b) a "−1" symbol for each portion of the equalized signal that is negative and has an amplitude exceeding the threshold value, and
(c) a "0" symbol otherwise.

5. An equalizer as claimed in claim 2 or claim 4, further comprising a controller having a peak detector connected to the output of the equalizer core for analyzing the equalized signal, and wherein the controller determines from analysis of the equalized signal the threshold value to be used by each slicer and passes that threshold value to each slicer.

6. An equalizer as claimed in claim 5, wherein the controller is configured:
(a) during periods when the peak detector determines the equalized signal from the equalizer core to be stable, to pass to each slicer a constant threshold value; and
(b) during periods when the peak detector determines the equalized signal from the equalizer core to be unstable, to pass to each slicer a threshold value that tracks the unstable signal.

7. An equalizer as claimed in claim 6, wherein the controller further comprises a hysteresis comparator having an input connected to the output of the peak detector, for controlling transitions between periods when the controller outputs a constant threshold value and periods when the controller outputs a threshold value that tracks the equalized signal.

8. An equalizer as claimed in claim 1, wherein the received signal is a coded RZ signal, and wherein decision corrector further comprises:
(a) a buffer for storing samples of the equalized signal from consecutive time periods; and
(b) a misplaced pulse detector for detecting misplaced pulses and double pulses based on the output of the zero assertion counter and the coding in the RZ signal,
and wherein the decision corrector further corrects the equalized signal by moving the misplaced pulse or doubled portion of the pulse forward or backward in time by moving or zero asserting samples within the buffer and outputting the results of the modified buffer.

9. An equalizer as claimed in claim 1, wherein the equalizer core is a linear equalizer.

10. An equalizer as claimed in claim 1, wherein the equalizer core is a decision feedback equalizer.

11. An equalizer as claimed in claim 1, wherein the equalizer core uses the least-mean-square algorithm for adapting tap values.

12. An equalizer as claimed in claim 1, wherein the equalizer core uses the RLS algorithm for adapting tap values.

13. An equalizer as claimed in claim 1, further comprising:
(a) a DC offset estimator having inputs connected to the outputs of the equalizer core and the decision corrector, for estimating a DC offset based on the outputs of the equalizer core and the decision corrector; and
(b) a DC offset remover having an input connected to the output of the DC offset estimator and an output connected to the input into the equalizer core, for removing the DC offset estimated by the DC offset estimator from the received signal prior to its input into the equalizer core.

14. An equalizer as claimed in claim 1, further comprising an error limiter connected between the error calculator and the equalizer core, for saturating the error signal produced by the error calculator to a predetermined maximum value before the error signal is passed to the equalizer core.

15. A receiver for use in a signal communication system, comprising an equalizer as claimed in claim 1 and further comprising:
(a) an analog-to-digital converter having an output connected to the input into the equalizer, for digitizing the received signal and passing the digitized signal to the equalizer;
(b) a timing error detector having an input connected to a plurality of taps of the equalizer, for measuring group delay and using the measured group delay to determine a timing error for the receiver; and
(c) adjustment circuitry connected between the output of the timing error detector and the analog-to-digital converter, wherein the adjustment circuitry adjusts the timing of the analog-to-digital converter based on the timing error output by the timing error detector.

16. A receiver as claimed in claim 15, further comprising a variable gain amplifier having an output connected to the input into the analog-to-digital converter, for amplifying the received signal prior to its digitization by the analog-to-digital converter.

17. A receiver as claimed in claim 16, wherein the controller is connected to the variable gain amplifier for the controller to calculate and send to the variable gain amplifier a control word selected to ensure that the quantization bit resolution for the analog-to-digital converter is maximized and to maintain the output of the analog-to-digital converter in an optimal range.

18. A receiver as claimed in claim 15, further comprising a signal detector having an input connected to the output of the analog-to-digital converter, wherein the signal detector is connected to send an enable signal to the equalizer on the first incoming "1" or "−1" symbol after the signal detector detects a signal from the analog-to-digital converter.

19. A method of equalizing a return-to-zero (RZ) signal received from a communication channel, comprising:
 (a) equalizing the received signal;
 (b) generating and synchronizing a clock with the timing of the received signal;
 (c) detecting and correcting misplaced pulses and double pulses in the equalized signal by forcing zeroes in those portions of the equalized signal that the synchronized clock indicates should be RZ zeroes, to produce a corrected signal therefrom;
 (d) calculating a timing error based on the equalized signal and the corrected signal; and
 (e) updating equalizer tap values based on the calculated timing error.

20. A method as claimed in claim 19, further comprising, prior to detecting and correcting misplaced pulses and double pulses in the equalized signal:
 (a) interpolating the equalized signal to produce a plurality of interpolated signals;
 (b) comparing each of the plurality of interpolated signals against a threshold value and outputting a signal having:
  (i) a "1" symbol for each portion of the interpolated signal that is positive and has an amplitude exceeding the threshold value,
  (ii) a "−1" symbol for each portion of the interpolated signal that is negative and has an amplitude exceeding the threshold value, and
  (iii) a "0" symbol otherwise; and
 (c) combining the plurality of outputted signals into a single signal that includes all "1" or "−1" symbols corresponding to pulses in any of the interpolated signals,
 and wherein the detecting and correcting step is performed on this combined output signal.

21. A method as claimed in claim 20, wherein the interpolation is performed using polyphase filter banks.

22. A method as claimed in claim 19, further comprising, prior to detecting and correcting misplaced pulses and double pulses in the equalized signal, comparing the equalized signal against a threshold value and outputting a signal having:
 (a) a "1" symbol for each portion of the equalized signal that is positive and has an amplitude exceeding the threshold value,
 (b) a "−1" symbol for each portion of the equalized signal that is negative and has an amplitude exceeding the threshold value, and
 (c) a "0" symbol otherwise,
 and wherein the detecting and correcting step is performed on this output signal.

23. A method as claimed in claim 20 or claim 22, further comprising setting the threshold value based on the measured stability of the equalized signal.

24. A method as claimed in claim 23, wherein:
 (a) during periods when the equalized signal is stable, the comparing step proceeds in a constant mode where the threshold value is set to and remains at a constant value; and
 (b) during periods when the equalized signal is unstable, the comparing step proceeds in a tracking mode where the threshold value is adjusted regularly to track the unstable signal.

25. A method as claimed in claim 24 wherein the tracking mode switches to the constant mode when the peaks detected in the equalized signal exceed a predetermined high threshold level, and wherein the constant mode switches to the tracking mode when the peaks fall below a predetermined low threshold level.

26. A method as claimed in claim 19, wherein the received signal is a coded RZ signal, and wherein the detecting and correcting step further comprises:
 (a) passing the equalized signal through a buffer;
 (b) detecting misplaced pulses and double pulses based on both the synchronized clock and the coding in the RZ signal; and
 (c) correcting the equalized signal by moving the misplaced pulse or doubled portion of the pulse forward or backward in time, by moving or zero asserting the samples of the equalized signal in the buffer and outputting the results of the modified buffer.

27. A method as claimed in claim 19, wherein the equalizing step is a linear equalization.

28. A method as claimed in claim 19, wherein the equalizer step is a decision feedback equalization.

29. A method as claimed in claim 19, wherein the equalization step uses the least-mean-square algorithm for adapting tap values.

30. A method as claimed in claim 19, wherein the equalization step uses the RLS algorithm for adapting tap values.

31. A method as claimed in claim 19, further comprising:
 (a) estimating a DC offset based on the equalized signal and the corrected signal; and
 (b) removing the estimated DC offset from the received signal prior to equalizing it.

32. A method as claimed in claim 19, further comprising saturating the timing error to a predetermined maximum value before updating the equalizer tap values based on that timing error.

33. A method as claimed in claim 19, further comprising:
 (a) digitizing the received signal through an analog-to-digital converter prior to equalizing it; and
 (b) adjusting the timing of the analog-to-digital converter based on the group delay indicated by updated tap values.

34. A method as claimed in claim 33, wherein a time constant is selected for adjusting the timing of the analog-to-digital converter that is significantly different from the time constant for the equalization step.

35. A method as claimed in claim 34, wherein the time constants are selected so that adaptation through the equalization step is significantly faster than adaptation through adjusting the timing of the analog-to-digital converter.

36. A method as claimed in claim 33, further comprising amplifying the received signal through a variable gain amplifier prior to digitizing it.

37. A method as claimed in claim 34, further comprising selecting for the variable gain amplifier a control word to maximize the quantization bit resolution for the analog-to-digital converter and to maintain the output of the analog-to-digital converter in an optimal range.

38. A method as claimed in claim 34, further comprising monitoring the output of the analog-to-digital converter, and enabling the equalization step on the first incoming "1" or "−1" symbol after detecting a signal from the analog-to-digital converter.

* * * * *